Nov. 23, 1948.   P. W. ROM   2,454,571
CULINARY OVEN WITH HEAT DIVERTING MEANS
Filed Sept. 3, 1946   2 Sheets-Sheet 1

INVENTOR.
Palmer W. Rom
BY
Louis O. French
Att'y.

Nov. 23, 1948.   P. W. ROM   2,454,571
CULINARY OVEN WITH HEAT DIVERTING MEANS
Filed Sept. 3, 1946   2 Sheets-Sheet 2
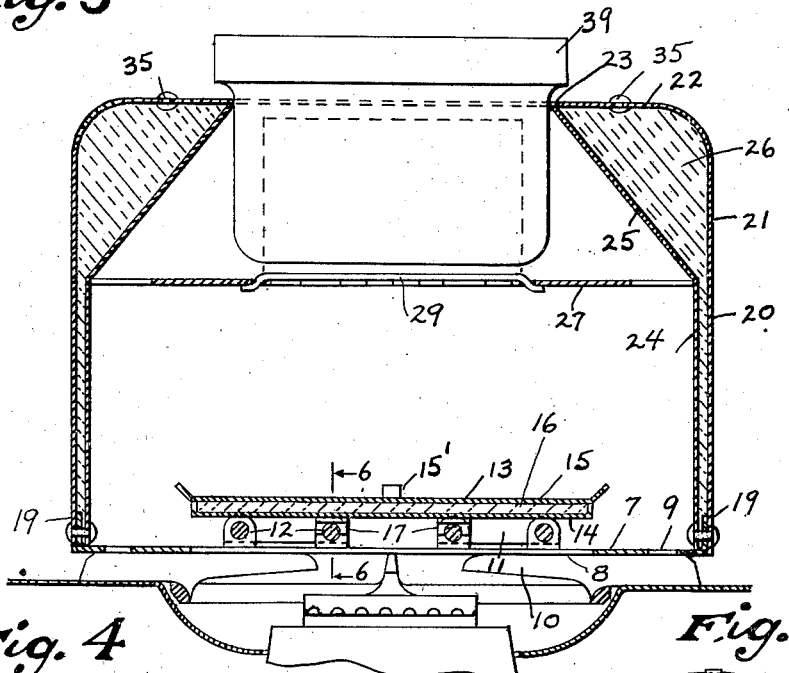
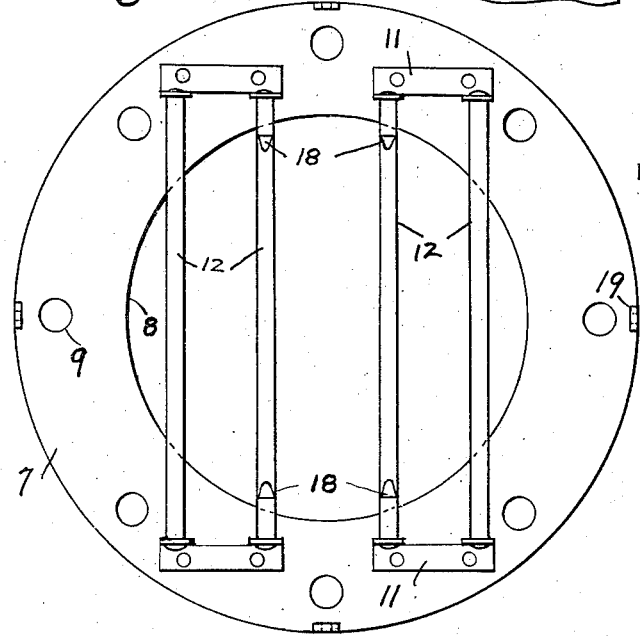
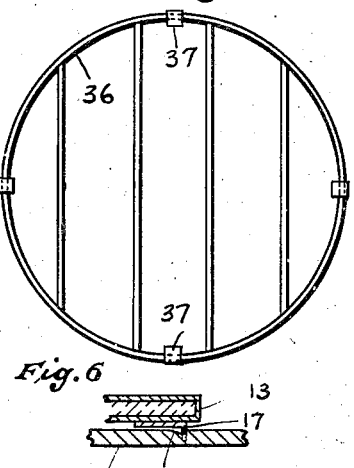
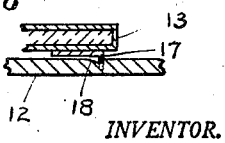
INVENTOR.
Palmer W. Rom
BY Louis O. French
Att'y.

Patented Nov. 23, 1948

2,454,571

UNITED STATES PATENT OFFICE 2,454,571

CULINARY OVEN WITH HEAT DIVERTING MEANS

Palmer W. Rom, Cudahy, Wis.

Application September 3, 1946, Serial No. 694,449

5 Claims. (Cl. 126—275)

The invention relates to culinary ovens.

The general object of the invention is to provide an oven in which several cooking operations may be carried on at the same time from a single source of heat and at high efficiency for the heat units used.

One of the objects of the invention is to provide a lower compartment in which a baking, broiling, frying, roasting, and boiling operation may be effected, an intermediate compartment in which baking or boiling operations may be carried on, and a top upon which boiling or frying operation may be carried out, the heat for all these operations being furnished by a burner or hot plate at the bottom of the oven. More particularly, the invention comprises a housing forming an enclosing apertured hood for a source of heat with a grid or grating at the base of said hood for receiving a cooking utensil or a heat insulated pad for a cooking utensil, a baffle intermediate the ends of said hood having means for supporting a cooking utensil thereon with means for diverting the heat thereto, and an apertured top toward which the insulated walls of the hood converge from above said baffle over or in which opening a cooking utensil may be supported. With the arrangement above described the cooking of a complete meal may be readily accomplished with a minimum expenditure of heat energy.

The invention further consists in the several features hereinafter set forth and more particularly defined by claims at the conclusion hereof.

In the drawings:

Fig. 3 is a vertical sectional view taken on the line 3—3 of Fig. 2;

Fig. 4 is a plan view of the base of the oven;

Fig. 5 is a plan view of the removable top grid;

Fig. 6 is a detailed vertical sectional view through certain of the parts taken on the line 6—6 of Fig. 3, parts being broken away.

Figure 1:
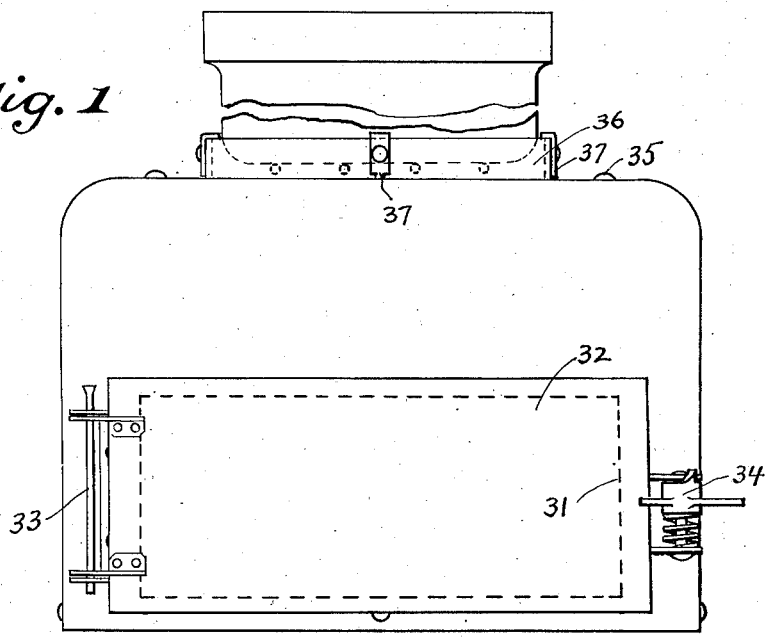
Fig. 1 is a front elevation view of an oven embodying the invention, parts being broken away.
Figure 2:
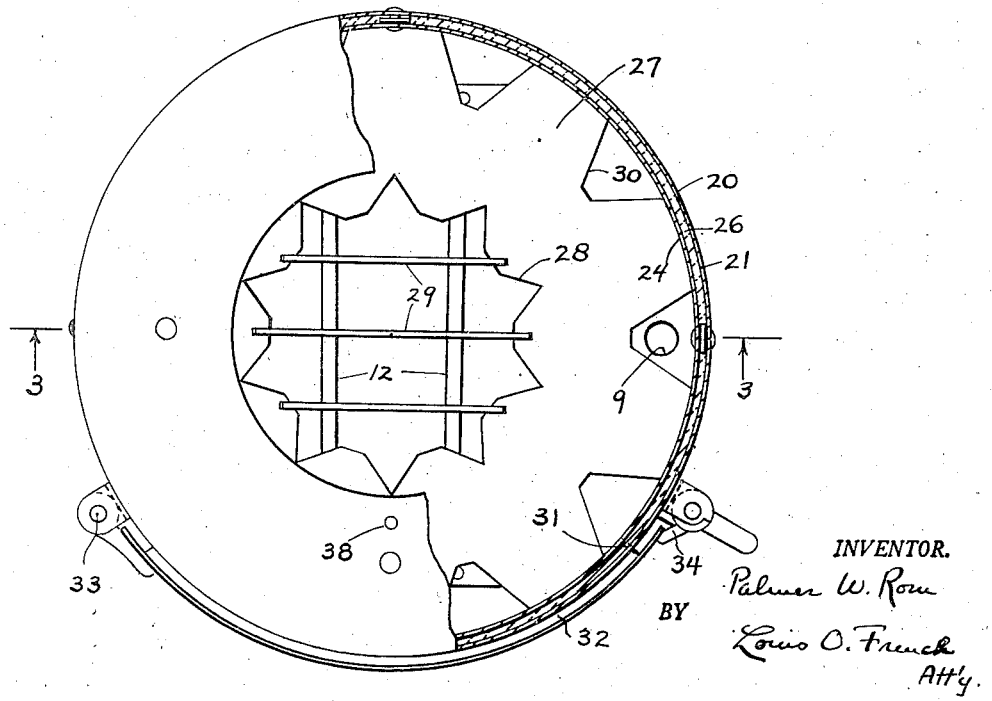
Fig. 2 is a plan view of the oven, parts being removed and parts being broken away and parts being shown in section.

Referring to the drawings, the oven includes a base plate 7 which in the hot plate burner type of application may comprise an annular metal ring but which in built-in ovens may be of other forms providing a central opening 8 and a plurality of peripheral small openings 9, said plate in the case of a gas burner adapted to rest on the burner grid 10. The plate 7 is provided with spaced set of angled metal brackets 11 in which rods 12 are mounted to provide open grid or grating above the central opening 8 upon which a cooking utensil used for broiling, frying, or boiling may be directly supported or upon which a heat insulated circular pad 13 may be supported for baking or roasting operations. The pad 13 is shown as composed of a pair of metal plates 14 and 15 with a layer of heat insulating material 16 therebetween, the lower plate carrying angled centering feet 17 notched to fit over the inner rods 12 of the grid and to engage in notches 18 therein to center said pad 13 relative to said grid and the opening 8, and the upper plate having centering projections 15'.

The plate 7 is provided with a series of upstanding apertured ears 19 for bolting it to the lower edge of a housing or hood 20.

The housing 20 has an outer metal wall section 21 here shown as cylindrically shaped with an annular top 22 providing an opening 23 and an inner metal wall section 24 of cylindrical shape from its bottom to an intermediate point, and then frusto-conically formed by walls 25 converging to the opening 23 in the outer wall section, said sections below the top opening being spaced apart, and the space 26 being filled with suitable insulating material of either sheet or fiber form, so that the inner wall of the hood is completely heat insulated.

Where the walls of the section 24 start to converge, a baffle plate 27 of sheet metal is secured to said walls. This plate is provided with a central opening 28 over which extend grid rods 29 and a series of peripheral openings 30, this plate acting to divert heat toward its center opening so as to allow heat to pass up the sides of the hood. The sides of the opening 28 are preferably of serrated form as shown as this has proved to give the best results, and the area of this opening is equal to or somewhat less than the opening 23 in the top of the hood.

Access to the lower portion of the hood is through an opening 31 closed by a heat insulated door 32 hinged at 33 to the lower outer side wall of the hood and secured in closed position by a spring urged pivotal latch 34.

The top of the hood is provided with projections 35 in the form of rivets, so that a large cooking utensil may be supported thereon over the opening 23 and in spaced relation to the top or the removable metal grid 36, shown in Fig. 5, may be mounted on the top as shown in Fig. 1 with its feet or legs 37 engaging in openings 38 in the top 22 of the hood to center said grid relative to said opening 23.

With the above described arrangement, baking or roasting operations may be effected in the lower compartment, when using the pad 13, or broiling, frying, or boiling of food with the utensil directly on the rods 12, boiling or baking operations may be effected on the grid 29 of the baffle 27, as shown by the dotted line outline of the utensil in Fig. 3, and boiling on the top with the grid 36 in place or frying with or without said grid 36, or the utensil 39 may be placed as shown in full in Fig. 3 for quickly heating the contents therein to the boiling point at the same time warming up the oven. With the pad 13 removed the utensil 39 is directly exposed to the source of heat. With the apparatus arranged as shown in Fig. 3 the utensil obturates or blocks off the top opening 23, but active circulation of the heated gases is effected nevertheless since these gases pass up through the central opening 8 and are deflected downwardly by the blocking utensil and the walls 25 through openings 30 and then pass downwardly along the walls 24 and out through the openings 9. Tests with a device constructed in accordance with Fig. 3 confirm this circulatory action. Thus the hot gases from the burner do not give their heat directly to the walls 24 but are heat insulated therefrom by the stream of gases passing downwardly along the walls 24 to the outlets 9. This circulatory action of the gases in my device is important because it gets the most out of the heat from the burner and does not rely on any heat conduction effect from the walls of the oven to furnish the cooking heat. It will also be noted that this same circulatory effect of the gases within the oven takes place to a lesser extent when the top opening 23 is partly closed off by either a cooking utensil 39 as shown in Fig. 1 or a utensil that may rest on the projections 35.

I find the device above described to be very economical in the use of gas, as the gas cock only needs a partial opening turn to furnish enough heat for carrying out the various cooking operations above described.

I desire it to be understood that this invention is not to be limited to any particular form or arrangement of parts except in so far as such limitations are included in the appended claims.

What I claim as my invention is:

1. An oven having a base provided with a large central burner opening and a plurality of peripherally disposed openings radially of the burner opening, a hood above said base including an inner heat insulated metal wall having a top deflector wall portion forming an opening adapted to be closed, a baffle mounted in said hood below said deflector wall portion having a central opening and side openings adjacent the wall, said side openings in said baffle and said peripheral openings in said base permitting gases passing upwardly through said central openings to pass downwardly along the inner wall of said hood.

2. An oven having a base provided with a large central burner opening and a plurality of peripherally disposed openings radially of the burner opening, a hood above said base including an inner heat insulated metal wall, the upper portion of which converges to an opening in the top of said hood adapted to be closed or partly closed by a cooking utensil, a baffle below the converging portion of said hood having a central opening and side openings adjacent the wall, said side openings in said baffle and said peripheral openings in the base permitting gases passing upwardly through said central openings to pass downwardly along the inner wall of said hood when said top opening is closed or partly closed.

3. An oven having a base provided with a large central burner opening and a plurality of peripherally disposed openings radially of the burner opening, a grid on said base at said large opening, a hood above said base including an inner heat insulated metal wall having a top deflector wall portion forming an opening adapted to be closed or substantially closed, a baffle mounted in said hood below said deflector wall portion having a central opening provided with a grid and side openings, said side openings in said baffle and said peripheral openings in said base permitting gases passing upwardly through said central openings to pass downwardly along the inner wall of said hood, said hood having an opening for access to the grid on said base, and a closure for said last named opening.

4. An oven having a base provided with a large central burner opening and a plurality of peripherally disposed openings radially of the burner opening, a grid on said base at said large opening, a utensil support mounted on said grid, a hood above said base including an inner heat insulated metal wall having a top deflector wall portion forming an opening adapted to be closed or substantially closed, a baffle mounted in said hood below said deflector wall portion having a central opening provided with a grid and side openings, said side openings in said baffle and said peripheral openings in said base permitting gases passing upwardly through said central openings to pass downwardly along the inner wall of said hood, said hood having an opening for access to the grid on said base, and a closure for said last named opening.

5. An oven as claimed in claim 4, in which the utensil support is mounted on the grid against movement relative thereto and provided with utensil retaining means.

PALMER W. ROM.

REFERENCES CITED

The following references are of record in the file of this patent:

UNITED STATES PATENTS

| Number | Name | Date |
| --- | --- | --- |
| 177,966 | Shirley | May 30, 1876 |
| 432,340 | Thurston | July 15, 1890 |
| 592,460 | Welz | Oct. 26, 1897 |
| 605,571 | Alexander | June 14, 1898 |
| 635,552 | Kennedy | Oct. 24, 1899 |
| 1,154,714 | Miller | Sept. 28, 1915 |